UNITED STATES PATENT OFFICE.

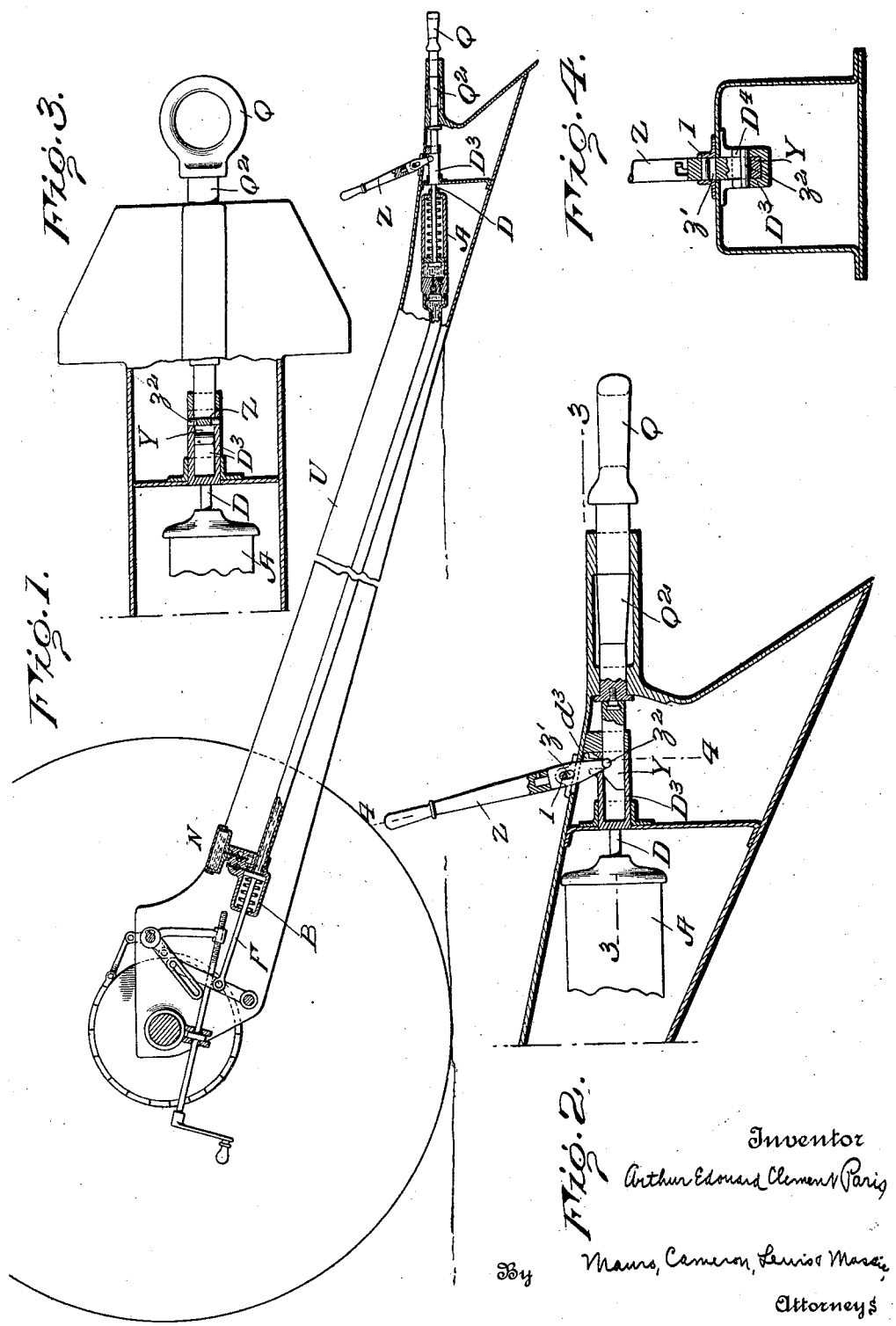

ARTHUR EDOUARD CLÉMENT PARIS, OF PUTEAUX, FRANCE.

AUTOMATIC TRAILER-BRAKE.

1,315,572.      Specification of Letters Patent.      Patented Sept. 9, 1919.

Original application filed February 14, 1918, Serial No. 217,262. Divided and this application filed February 28, 1919. Serial No. 279,832.

*To all whom it may concern:*

Be it known that I, ARTHUR EDOUARD CLÉMENT PARIS, a citizen of the Republic of France, and a resident of Puteaux, Seine, France, have invented a new and useful Improvement in Automatic Trailer - Brakes, which invention is fully set forth in the following specification.

The present invention relates to improvements in automatic apparatus for braking the wheels of motor-car trailers and the rear carriages of guns shown and described but not specifically claimed in my application Sr. No. 217,262, filed Feb. 14, 1918, of which the present application is a division.

These improved devices are designed on the one hand to render the brake of the trailer inoperative when it is desired to cause the tractor with its trailer to execute as a whole a rearward movement through a certain distance. These devices are designed on the other hand to enable the brake of the trailer to be operated by hand if required; the option of operating by hand may be necessary when the tractor and the trailer are to be stopped as a whole on a gradient or in the case of a breakage of the coupling between the tractor and its trailer.

In my application Sr. No. 193,214, filed Sept. 25, 1917, I have described and shown brake apparatus automatically operated by a piston connected through a piston rod with a bar connected to a coupling yoke. In accordance with the present invention, the bar connecting the coupling yoke to the rod of the piston is split up into two elements with a coupling located between them, and mechanism is provided for actuating the element that is fixed to the rod of the piston allowing movement of the latter without moving as well the yoke which is in a fixed or uncoupled state at that moment.

One constructional form of the apparatus is illustrated in the accompanying drawings in which—

Figure 1 is a side elevation of the general arrangement of a wheel brake applied to the wheeled axle of a gun carriage and provided with my improvements;

Fig. 2 is a vertical longitudinal section showing the construction of the device;

Fig. 3 is a horizontal sectional view on line 3—3 of Fig. 2; and

Fig. 4 is a vertical cross-section on line 4—4 of Fig. 2.

In Fig. 1, F is a brake rod having a piston working in a cylinder B having a conduit connection U with a piston cylinder A. Fluid is supplied to the cylinders by a reservoir N. This part of the apparatus constitutes in substance the subject-matter of my application Sr. No. 193,214, filed Sept. 25, 1917.

In the drawings, the coupling element carried by the rod D consists of a socket $D^3$ in which a hook Y is adapted to move, that is rigidly fixed to the bar $Q^2$. A recess $d^3$ of the socket $D^3$ is adapted to be engaged by the lower end of a lever Z movable by means of a buttonhole shaped slot $z'$ around an axle 1 carried by the gun carriage trail. This slot $z'$ is made of such size as to allow the lever Z to rotate, and also to rise slightly therein. The lower end of the lever carries an angle pin $z^2$ which normally (that is to say, when the parts are arranged for the automatic operation of the brake) is in engagement with the hook Y of the yoke bar $Q^2$. By simply raising the lever, the axle pin $z^2$ can be moved into the position whereby it is released from the hook Y and by that movement opens the coupling between the yoke bar $Q^2$ and the rod D.

The lever thus raised remains, however, in engagement with the socket $D^3$ which is held by the axle pin $z^2$ in guides $d^4$ formed on the two sides of the aperture $d^3$ in the socket $D^3$. By this guidance of the lever in the socket, the movement of the said lever from left to right will move the socket $D^3$ and piston rod D to the left.

By a movement of the lever in the reverse direction, the socket $D^3$ is returned into its original position and by a succeeding depression of the lever Z the connection between the axle pin $z^2$ and the hook Y is reestablished.

What is claimed is:—

1. In brake apparatus for trailers and rear gun carriages wherein the operation of the brake mechanism is effected by movement of a normally restrained piston, the combination of an operating rod connected to said piston and provided with a socket member, a yoke-bar provided with a hook adapted to work in said socket and a lever having longitudinal play on its fulcrum and provided at one end with means for coupling said hook and socket when said lever is at one extremity of its play and for uncoupling said hook while engaging said socket when at the opposite end of its play for manually operating said piston.

2. In brake apparatus for trailers and rear gun carriages wherein the operation of the brake mechanism is effected by movement of a normally restrained piston, the combination of an operating rod connected to said piston and having a socket member, a yoke-bar provided with a hook adapted to work in said socket, and a lever having a slot for receiving a fulcrum pin and provided at one end with a pin adapted when the lever is at one end of its slot to engage said hook to couple the latter to said socket and when at the opposite end of its slot to release said hook while engaging said socket for manually operating said piston.

In testimony whereof I have signed this specification.

ARTHUR EDOUARD CLÉMENT PARIS.

Copies of this patent may be obtained for five cents each, by addressing the "Commissioner of Patents. Washington, D. C."